US 6,644,696 B2

(12) United States Patent
Brown et al.

(10) Patent No.: US 6,644,696 B2
(45) Date of Patent: *Nov. 11, 2003

(54) COIN-DISCRIMINATOR VOUCHER ANTI-COUNTERFEITING METHOD AND APPARATUS

(75) Inventors: David J. Brown, Sammamish, WA (US); Steven Geiger, Stanwood, WA (US); Timothy Manion, Seattle, WA (US); Scott Scherer, San Francisco, CA (US)

(73) Assignee: Coinstar, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/039,181

(22) Filed: Jan. 5, 2002

(65) Prior Publication Data

US 2002/0175515 A1 Nov. 28, 2002

Related U.S. Application Data

(63) Continuation-in-part of application No. 09/422,917, filed on Oct. 21, 1999, which is a continuation-in-part of application No. 07/940,931, filed on Sep. 4, 1992.
(60) Provisional application No. 60/105,508, filed on Oct. 23, 1998.

(51) Int. Cl.[7] .............................................. B42D 15/00
(52) U.S. Cl. ........................ 283/67; 283/70; 283/113; 283/901; 283/72; 700/235
(58) Field of Search .............................. 283/67, 70, 113, 283/901, 72; 700/235, 14, 16, 21; 194/216; 380/54

(56) References Cited

U.S. PATENT DOCUMENTS 4,436,103 A 3/1984 Dick
4,977,502 A 12/1990 Baker et al.
5,466,012 A 11/1995 Puckett et al.
5,570,123 A 10/1996 Almonte
5,835,689 A 11/1998 Braun et al.
5,909,793 A 6/1999 Beach et al.
5,917,996 A 6/1999 Thorpe
5,970,875 A 10/1999 Hoffmann et al.
5,995,942 A * 11/1999 Smith et al. .................. 705/14
6,116,402 A 9/2000 Beach et al.
6,318,536 B1 11/2001 Korman et al.
6,349,972 B1 * 2/2002 Geiger et al. ................. 283/67
6,413,305 B1 7/2002 Mehta et al.

FOREIGN PATENT DOCUMENTS

EP 0 351 217 A2 1/1990
GB 2 271 456 A 4/1994

OTHER PUBLICATIONS

Search Report, GB Application No. 9925225.6, Mar. 20, 2000, 4 pages.
International Search Report, International Application No. PCT/US02/26245, Dec. 9, 2002, 3 pages.

* cited by examiner

Primary Examiner—Willmon Fridie, Jr.
(74) Attorney, Agent, or Firm—Perkins Coie LLP (57) ABSTRACT

Vouchers and methods for providing vouchers configured to assist in distinguishing unauthorized duplicate or counterfeit vouchers are disclosed herein. In one embodiment, a voucher can include a substrate, a first indicia on the substrate, and a thermally responsive second indicia on the substrate. At least one of the first indicia and the second indicia indicating a value of the voucher. In another embodiment, a method is provided to assist in distinguishing duplicate or counterfeit vouchers. The method includes providing a substrate with a thermally responsive first indicia, and printing on the substrate at the coin-counting machine at least a second indicia. The second indicia containing at least an indication of a value of the voucher.

29 Claims, 5 Drawing Sheets

COIN-DISCRIMINATOR VOUCHER ANTI-COUNTERFEITING METHOD AND APPARATUS

CROSS-REFERENCE TO RELATED APPLICATION(S)

This application is a continuation-in-part of U.S. patent application Ser. No. 09/422,917, filed Oct. 21, 1999, and currently pending, which claims priority to U.S. Provisional Patent Application No. 60/105,508, filed Oct. 23, 1998. Cross-reference is made to U.S. patent application Ser. No. 09/035,273, filed Mar. 8, 1998 which is a continuing application claiming priority from Ser. No. 08/237,486 filed May 3, 1994 (now U.S. Pat. No. 5,620,079) which is a continuation-in-part of U.S. patent application Ser. No. 07/940,931 filed Sep. 4, 1992 which is the parent of U.S. application Ser. No. 08/255,539 filed Jun. 6, 1994 (now U.S. Pat. No. 5,564,546) and cross-reference is further made to U.S. application Ser. No. 09/178,441 for "Voucher Coding for Self-Service Coin Discriminator" filed on Oct. 23, 1998 (now U.S. Pat. No. 6,116,402) and to PCT/US97/11174 filed Jun. 27, 1997 for "Coin Discrimination Apparatus and Method, all of which are incorporated herein by reference.

TECHNICAL FIELD

The present invention relates to the provision of vouchers in connection with a coin-discriminator and/or counter and in particular ways of deterring, reducing, eliminating or detecting unauthorized duplication or counterfeiting of vouchers.

BACKGROUND

At least some types of coin-discriminators are configured to receive a plurality of coins of various denominations, e.g., from untrained users (such as grocery store or other retail location customers), typically including non-coin items and/or foreign or other undesired coins, to discriminate the various denominations of the desired coins (possibly after separating non-coin items and/or undesired coins) to determine the value of the discriminated desired coins, and to output an indication of the value of the total amount of the discriminated, desired coins. Although many forms of such value output may be termed a voucher, including paperless output (such as depositing a value in a user's bank account, e.g., after reading a user's bank card or other identifier), the present invention is particularly directed to devices which include apparatus or procedures for outputting a physical voucher such as a paper voucher with indicia indicating a value related to the total amount of discriminated, desired coins. Although such physical vouchers will be discussed as "paper" voucher hereinbelow, its possible to provide physical vouchers in other forms such as with indicia placed on other substrates such as plastic, cardboard, magnetic or other non-visible information-bearing media and the like.

Because a physical or "paper" voucher has value, in the sense that it can be redeemed for, e.g., cash or credit, it is important for the redeemer to have confidence that a voucher which is presented for redemption is genuine, i.e., is not an unauthorized duplicate or counterfeit voucher. Verifying the genuineness of a voucher is especially difficult in the face of sophisticated image production, reproduction or manipulation technologies such as color photocopy technology, color scanning technologies, computer-based printing technologies such as inkjet (including color inkjet) or laser (including color laser) printer, e.g., coupled to personal computers, work stations and the like. Accordingly, it would be useful to provide vouchers whose genuineness can be readily determined, as compared to an unauthorized duplicate or counterfeit voucher, e.g., produced using such image duplication production, reproduction or manipulation technologies.

Some approaches to detecting unauthorized duplication or counterfeiting have involved encrypting certain information which is then printed on the voucher as part of the voucher printing procedure such that decryption provides a level of confidence that the voucher is genuine. One such procedure is described in U.S. patent application Ser. No. 09/178,441, incorporated herein by reference. Although such encryption/decryption procedures can be quite useful (and indeed, can, if desired, be used in combination with some or all features of the present invention), there are circumstances in which it may be desirable to provide for other counterfeit detection measures, in addition to or in place of such encryption/decryption measures.

In some circumstances, it may be desirable to provide anti-counterfeit measures or devices which are independent of the need for substantial modification of printing, check-out or verification software (of the type that might be used in connection with encryption/decryption). For example, it may be desired to avoid making modifications to printing software and/or to avoid modifying or providing software for decryption. Furthermore, in some circumstances it may be desired to avoid the personnel training or hardware involved in a decryption verification process. For example, in some circumstances it is desirable to permit the voucher redemption (which may typically occur at a grocery store or other retail location check-out stand) to be performed, in whole or in part, based on a visual inspection of the voucher (e.g., without the need to perform a decryption step). In some circumstances it may be desirable to provide for duplicate/counterfeit detection without the need for using a computer or other equipment.

Many self-service coin-discriminators of a type with which the present invention may be used employ a thermal printer for outputting a paper voucher. Thermal printers can be particularly useful because of the lack of a requirement to replenish ink or toner. Thermal printers typically operate in conjunction with a type of paper specific to thermal printing ("thermal paper"). Thermal paper often has characteristics which limit how the paper may be treated (e.g., limiting the types of ink or other materials that may be used in connection with providing, for example background preprinting, watermarks and the like). Accordingly, it would be useful to provide voucher duplication/counterfeiting detection or prevention which can be reasonably and feasibly used with thermal papers and/or thermal printers (e.g., without incurring relatively high costs).

Although there are benefits to an anti-counterfeiting system which provides for detection of unauthorized duplications or counterfeits (at least in part) using a visual inspection of the voucher, a system in which all anti-counterfeiting features are features which are normally visible also means that potential counterfeiters can determine what features need to be copied or duplicated by performing a visual inspection of a valid voucher. Accordingly, it would be useful, in some embodiments, to provide at least some anti-counterfeiting features which are not normally visible, i.e., which are not visible in ordinary ambient light of a redemption location.

Because, in at least some systems, voucher redemption is performed at a retail location, such as during ordinary retail purchase "check out", it would be useful to provide anticounterfeiting procedures or devices which can be performed relatively rapidly so as to avoid checkout line delays. For example, it would be useful if some or all anti-counterfeiting features can be used for verification without the need for special positioning or manipulation of a voucher and/or without the need for manually inputting features or information from the voucher and preferably without the need to provide special equipment for voucher verification at checkout locations.

In situations where coin-discriminators are already being used, it would be useful to provide for voucher anti-counterfeiting measures which include features that can be provided with little or no modification of coin-discriminator hardware and/or retail location check-out hardware. In some embodiments, it would be useful to provide at least some anti-counterfeiting features which can be implemented by loading paper into already-existing coin-discriminators and substantially without modification of coin-discriminator hardware.

SUMMARY

The present invention includes at least one and preferably a plurality of features provided in or on paper (or other substrate) used for printing a voucher. In one embodiment, at least some portions of the paper are pre-printed or otherwise pre-provided (i.e., printed or provided prior to the printing or providing of indicia indicating the value of the voucher) in ink which is not readily reproducible by ordinary color photocopiers, such as certain fluorescent inks. In one embodiment, the paper (or other substrate) is provided with a plurality of perforations in a pattern which is not readily reproducible such as a pattern including curved or otherwise non-linear patterns of perforation preferably with the perforations being relatively small and closely spaced and the pattern defining relatively tight-radiused but preferably substantially continuous curves.

In one embodiment, the voucher is provided with printing on both surfaces which are registered relative to one another in such a fashion that the registration may be readily verified (e.g., by holding the voucher up to a light or otherwise backlighting a voucher so as to view at least some portions of printing on the two surfaces simultaneously). In some embodiments, portions of the voucher are printed with a material which has relatively low visibility, or is substantially invisible, until such portion is treated or manipulated, e.g., such as by rubbing or scratching with a coin or other object.

Preferably at least two or more anti-counterfeiting features of a voucher can be verified by viewing only one surface of the voucher, i.e., without the need to flip the voucher over to view the opposite side.

In some embodiments, some or all features are features which permit voucher verification using only visual inspection of the voucher, i.e., without the need to use any equipment. In other embodiments, at least one feature is a feature which is not readily apparent in ordinary or typical light (so as to render it difficult for a potential counterfeiter to even be aware of, much less to duplicate, such feature) such as providing markings which fluoresce or otherwise have detectable properties when viewed in specific types of light such as ultraviolet light.

In some embodiments, the voucher paper is preprinted or preprovided with indicia which are oriented in different fashions (such as both vertically and horizontally) and/or are positioned near the edge of the paper or are otherwise oriented or positioned in a fashion which may be difficult to duplicate with typical computer-based printers.

DETAILED DESCRIPTION

Figure 1:
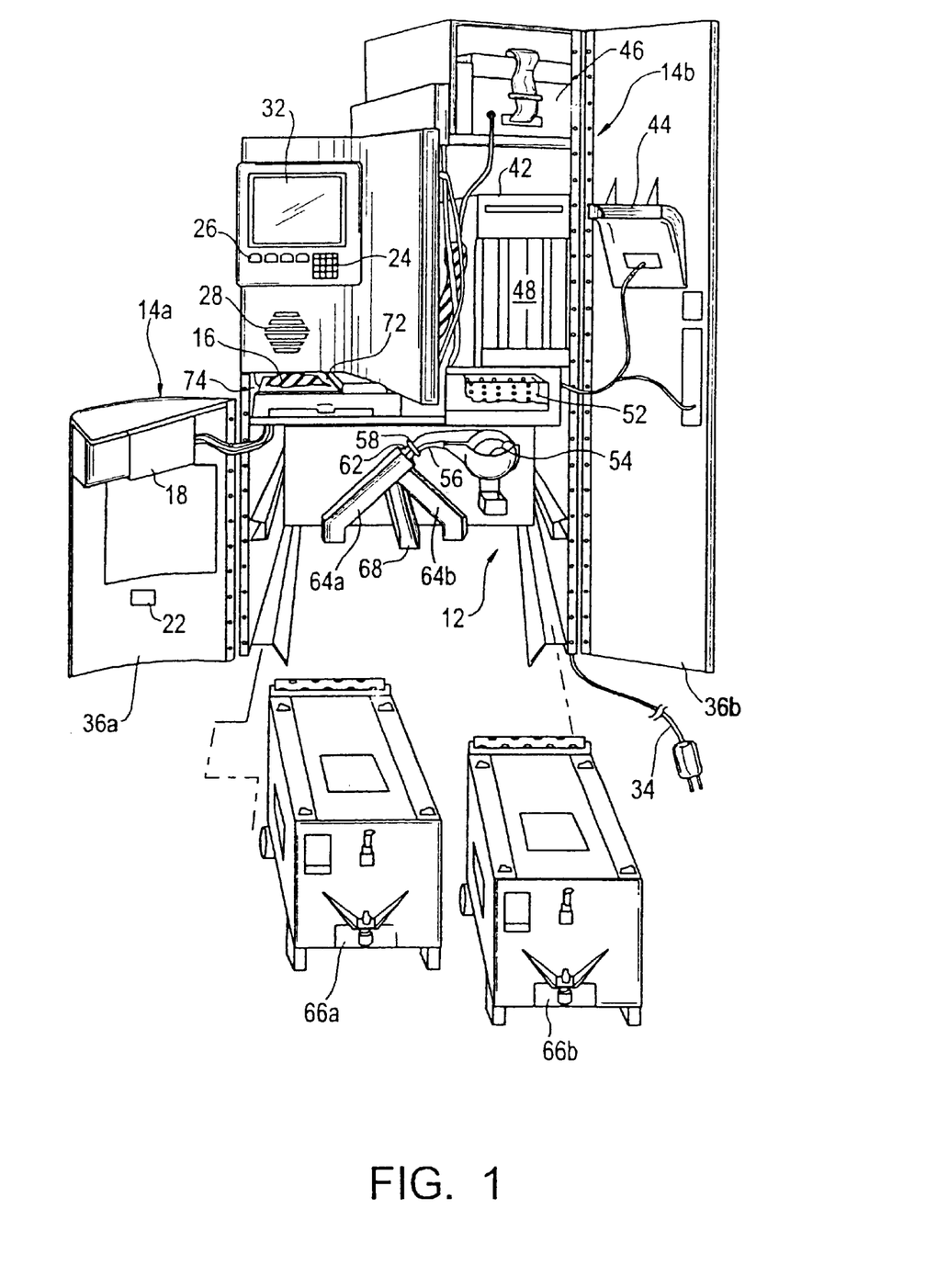
FIG. 1 is a perspective view of a coin-discriminating device, in an opened configuration, of a type which may be used in at least one implementation of the present invention.

FIG. 1 is a perspective view of a coin-discriminator of a type which can be used in connection with embodiments of the present invention. The embodiment depicted in FIG. 1 generally includes a coin counting/sorting portion 12, a voucher dispensing portion 14a and a coupon dispensing portion 14b. In the depicted embodiment, the coin counting portion 12 includes an input tray 16, a coin return region 22, and customer I/O devices, including a keyboard 24, additional keys 26, a speaker 28 and a video screen 32. The apparatus can include various indicia, signs, displays, advertisement and the like on its external surfaces. A power cord 34 provides power to the mechanism.

Preferably, when the doors 36a, 36b are in the open position as shown, most or all of the components are accessible for cleaning and/or maintenance. In the depicted embodiment, a voucher printer 18 is mounted on the inside of the door 36a. A number of printers can be used for this purpose. In one embodiment, a model KLDS0503 printer, available from Axiohm is used. The right-hand portion of the cabinet includes a coupon feeder 42 for dispensing, e.g., pre-printed manufacturer coupon sheets through a chute 44 to a coupon hopper on the outside portion of the door 36b. A computer 46, in the depicted embodiment, is positioned at the top of the right hand portion of the cabinet in order to provide a relatively clean, location for the computer. An I/O board 48 is positioned adjacent the sheet feeder 42.

The general coin path for the embodiment depicted in FIG. 1 is from the input tray 16, doves first and second chutes to a trommel 52, to a coin pickup assembly 54, along a coin rail 56 and past a sensor 58. If, based on sensor data, it is determined that the coin can and should be accepted, a controllable deflector door 62 is activated to divert coins from their gravitational path to coin tubes 64a, b for delivery to coin trolleys 66a, b. If it has not been determined that a coin can and should be accepted, the door 62 is not activated and coins (or other objects) continue down their gravitational or default path to a reject chute 68 for delivery to a customer-accessible reject or return box 22.

In use, a user is provided with instructions such as on computer screen 32. The user places a mass of coins, typically of a plurality of denominations (typically accompanied by dirt or other non-coin objects) in the input tray 16. The user is prompted to push a button to inform the machine that the user wishes to have coins discriminated. Thereupon, the computer causes an input gate (not shown) to open and provides a signal to prompt the user to begin feeding coins When the gate is open, a motor is activated to begin rotating the trommel assembly 52. The user moves coins over the peaked output edge 72 of the input tray 16, typically by lifting or pivoting the tray by handle 74, and/or manually feeding coins over the peak 72. The coins pass the gate (typically set to prevent passage of more than a predetermined number of stacked coins, such as by defining an opening equal to about 3.5 times a typical coin thickness). Instructions on the screen 32 may be used to tell the user to continue or discontinue feeding coins, can relay the status of the machine, the amount counted thus far, provide encouragement or advertising messages and the like. The coin rail 56 functions to receive coins output by the coin pickup assembly 54, and transports the coins in a singulated (one-at-a-time) fashion past the sensor 58 to the diverting door 62. Once no more coins are detected and/or in response to user input, the system determines that the transaction is complete and the computer 46 will send instructions to he printer 18 causing the printer to output a voucher of a type which may be exchanged for Hoods, services or cash.

Figure 2:
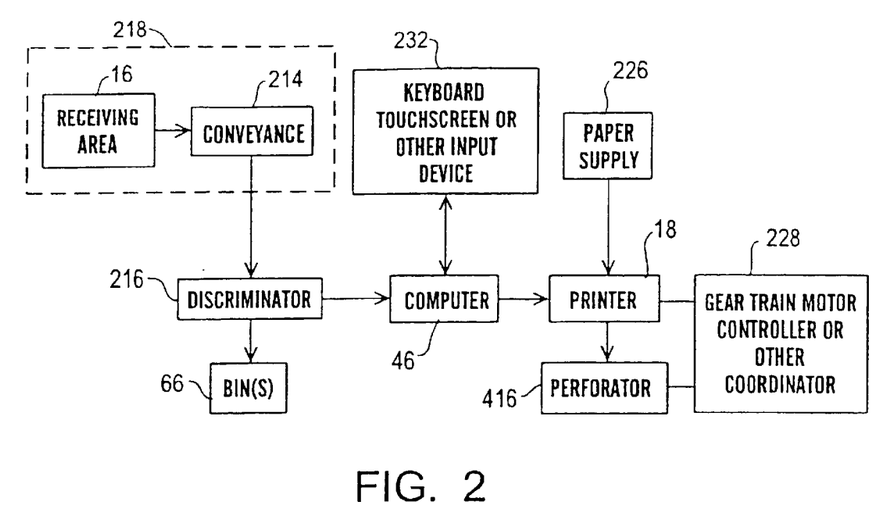
FIG. 2 is a block diagram depicting certain components of a coin discriminator of a type which can be used in accordance with implementation of the present invention.

FIG. 2 is a block diagram of a coin-discriminator of a type which can be used in accordance with implementations of the present invention. Some of the items in FIG. 2 correspond to components in the device of FIG. 1. In operation, an untrained user, such as a grocery store or other retail location customer places a plurality of coins of unknown value and random orientation in a receiving tray or other receiving area 16. Typically, foreign or other undesirable coins and foreign objects such as currency or other paper, paper clips, lint, keys and the like are mixed with the desired coins and placed, such as being poured or dumped, substantially all at once, into the tray 16. A conveyance device 214, such as a chute, trough, slide or the like, or including positive drive or otherwise moving conveyances such as conveyer belts, Archimedes' screws and the like, are used to provide at least some of the desired coins from the receiving area 16 to a coin-discriminator 218. Preferably, prior to entry to the discriminator 218, at least some of the foreign objects or materials are separated such as using airflow, vacuum, gravitational separation, size-based separation (such as through openings of predetermined size or sizes) and the like. The discriminator 216 provides a signal to a calculating device, preferably a computer with sufficient information regarding the number of desired coins of various denominations such that the computer 46 can output or store a value equal to or related to (such as being a predetermined amount or portion less than) the value of the desired discriminated coins which are then placed in one or more bins 66 or other receiving regions. The computer 46, at the end of a transaction (as indicated by lack of further input of coins for a predetermined period and/or input from a user) controls a paper voucher printer 18 to print, on paper (or other substrates) obtained from a roll of paper or other paper supply 226 a redeemable voucher for an amount related to the total value of the discriminated desired coins for this transaction.

Figure 3A:
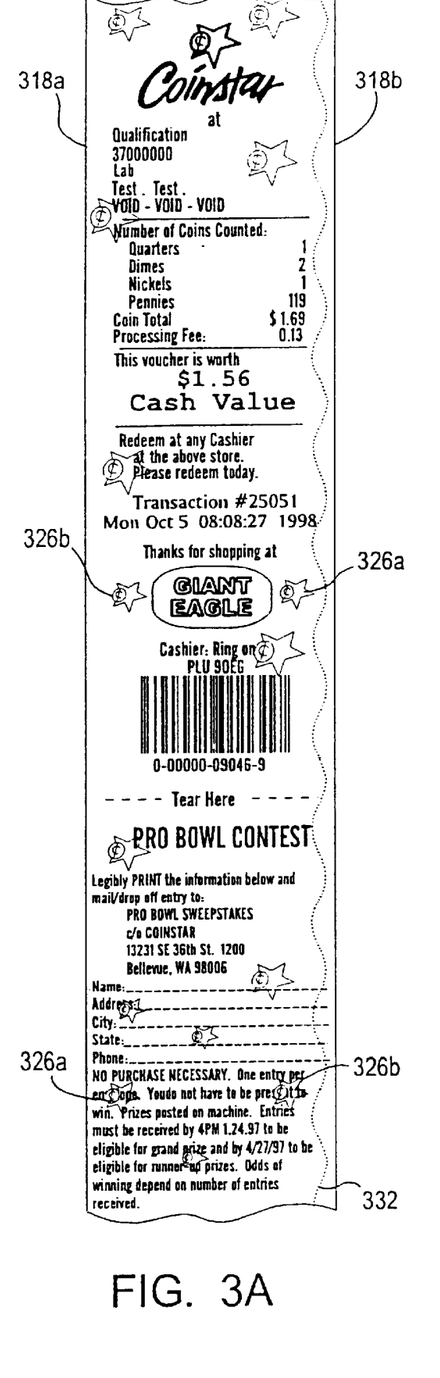
FIG. 3A is a front view of a voucher of a type which may be used according to one embodiment of the present invention.
Figure 3B:
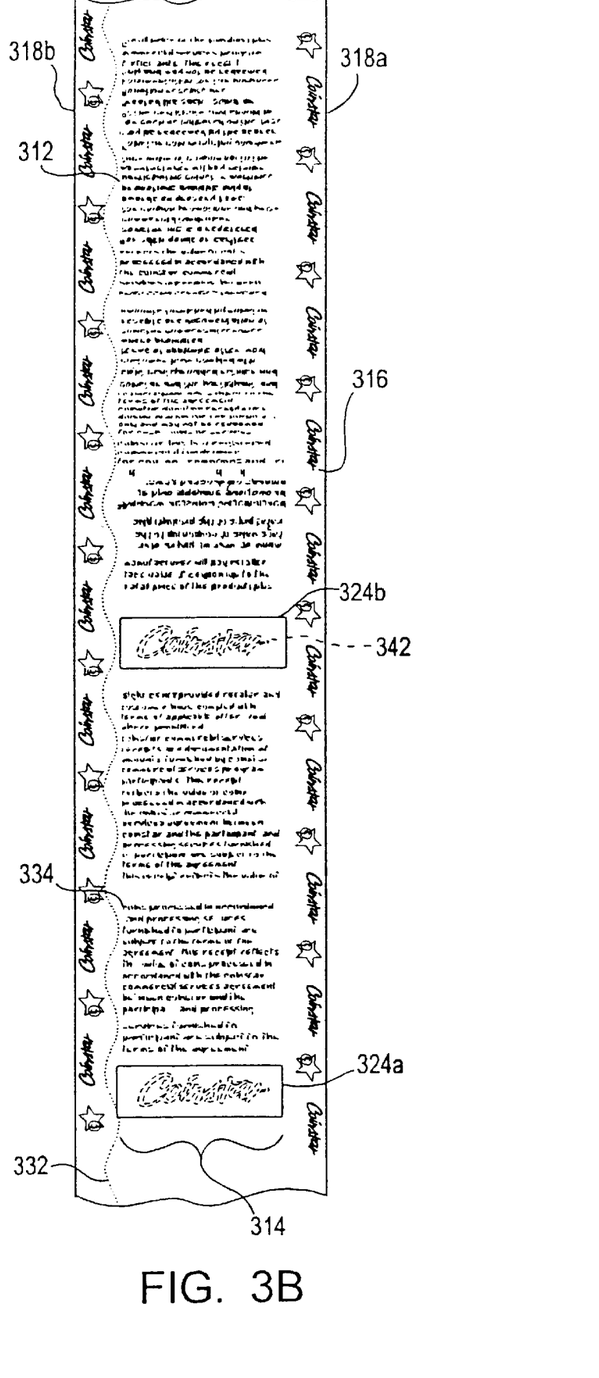
FIG. 3B is a view of the back surface of the voucher of FIG. 3A with FIG. 3B being positioned in alignment with FIG. 3A to show relative locations of features on opposite surfaces.

FIGS. 3A and 3B depict a number of features of a voucher useful for avoiding, preventing and/or detecting unauthorized duplication or counterfeiting of vouchers. FIGS. 3A and 3B are presented herein in a fashion which indicates the relative positions of the indicia or marking on the front surface (FIG. 3A) and the opposite or rear surface (FIG. 3B). I.e., features which are shown as aligned in corresponding locations in FIGS. 3A and 3B are features which would appear at corresponding longitudinal positions on opposite surfaces of the voucher.

In the depicted embodiment, the rear surface (FIG. 3B) of the voucher includes printing 312 generally in the central region 314 of the rear surface. According to one embodiment of the invention, printing 312 is provided using an ink which, if copied using a conventional color photocopier, will result in a photocopy which is altered in appearance with respect to the original printing 312. In one embodiment, the printing 312 is in a fluorescent or metallic ink, preferably a fluorescent orange ink which, when photocopied, appears as a purple or maroon color rather than an orange color.

Although there may be several types of inks which do not readily photocopy, it is which is believed that many such inks cannot readily be applied to thermal paper. Examples of inks which can be used, and which have been found to be useful for application to thermal paper, include neon pink PMS 805, neon yellow PMS 803 and neon green PMS 802. It should be understood that these represent examples of inks which may be used but are not intended to be an exhaustive listing.

In the embodiment of FIG. 3, the rear surface of the voucher also contains printing 316, positioned on or relatively close (such as within about ¼ inch, preferably within ¹⁄₁₀th inch of) the voucher edge 318a, 318b. Preferably, the edge printing 316 is also provided in an ink which is not readily photocopied without an alteration in appearance. In one embodiment, the edge printing 316 is in a color different from that of the central printing 312 and, in one embodiment, is provided in fluorescent yellow ink. In the depicted embodiment the central printing 312 is in a first (e.g., lateral) orientation, and the edge printing 316 is in an orientation which is at an angle (e.g., 90°) to the first orientation (e.g., vertical).

As described more fully below, it is preferred that some or all anti-counterfeiting features described herein can be provided as pre-printing or pre-providing (i.e., can be provided on the paper stock or paper supply 226 before it is fed to the printer 18). This is particularly useful in connection with providing the edge printing 316 relatively close to the edges 318a, b since close-to-edge printing is a feature which is difficult to reproduce with many inkjet, laser or other computer based printers (which often require a minimum space, such as a space no less than about ¼ inch, between the paper edge and printing provided by such printer).

In the embodiment depicted in FIGS. 3A and 3B, certain visible features on the front and rear surfaces are registered, such that they occur in a predetermined spatial relationship on the front and rear surfaces. In the embodiment of FIGS. 3A and 3B, printed rectangles 324a, 324b on the rear surface are aligned with indicia (in this case, star logos) 326a,b,c,d on the front surface. Preferably the printing of the indicia 326a,b,c,d on the front surface is of such a nature that it is at least partially visible when viewing the rear surface, such as when the voucher is held up to the light or otherwise backlit in such a fashion that the indicia 326a, 326c appear to be registered within the box 324a when viewing the rear surface. Preferably, the registration is of a nature (such as providing for relatively close sizing and spacing of the logos 326 as compared to the boxes 324) such that even relatively small misregistration (i.e., in which the printing on the front surface is not precisely aligned with corresponding printing on the rear surface) is readily detectable by visual inspection. This feature is useful because it is relatively difficult to use photocopying, inkjet or laser printer technology for providing printing on two opposite surfaces of a page or paper such that the printing on the opposite surfaces are closely registered (e.g., within about ⅛ inches). Preferably, according to the present invention, such opposite-surface printing provides registration on the front and rear surfaces which are mix-registered in either a longitudinal or vertical direction by no more than about ⅛ inches, preferably no more than about ¹⁄₁₆ inches and more preferably no more than about ¹⁄₃₂ inches.

In the embodiment of FIGS. 3A and 3B, a pattern of perforations 332 is visible on both surfaces of the voucher. When perforations are used for purposes such as facilitating tearing or separation of paper segments, such perforations are typically in straight lines or a series of straight line segments. According to an embodiment of the present invention, perforations are provided in a pattern which includes some portions which having a curved appearance (even though each individual perforation may itself be straight) such as depicted in FIGS. 3A and 3B. Such curved-pattern perforations are believed to be useful since they are readily visibly verified and relatively difficult for a counterfeiter to copy or reproduce. Preferably, the curved pattern includes portions 334 which have a relatively small radius of curvature such as radius of curvature of less than about ½ inch, preferably less than about ¼ inch. In one embodiment, the perforations are micro-perforations, such that each perforation has a length of about 0.4 mm, a width of about 0.01 mm, and an inter-perforation spacing of about 0.2 mm.

In one embodiment, regions or indicia are preprinted 342 using an ink or other substance which preferably is substantially non-apparent or invisible (such as having a color, reflectivity, texture and the like closely matching that of the unprinted paper), but which, when rubbed or scratched with the edge of a coin, will cause minute amounts of the coin to rub off and adhere only to the printed portion, leaving a visible mark (indicated in FIG. 3 by phantom lines 342). In one embodiment, such indicia are provided by printing using an ink which includes titanium oxide. Thus, it is typically difficult for a would-be counterfeiter to know which indicia should be printed in such non-visible ink since the indicia which are printed in a valid voucher are not readily apparent. However, the voucher may be relatively easily validated using only a ordinarily-available coin, i.e., without the use of special equipment.

Figure 4:
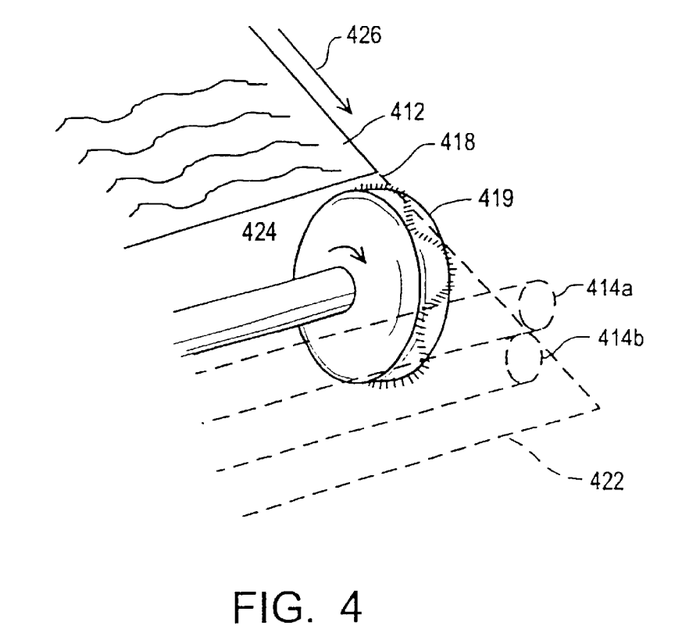
FIG. 4 is a partial perspective view of a perforation wheel according to an embodiment of the present invention.

Although it is possible to provide perforation of the type described as part of the paper stock 226, in one embodiment, the pattern of perforations is provided in conjunction with the process of printing the value of the voucher using the printer 224. As depicted in FIG. 4, in one embodiment as the paper, following the printing, leaves the printer 224, the paper moves from a first exit position 412 and is conveyed, e.g., by pinch rollers 414a, 414b across the edge of a perforating roller 416 whose edge has, radially protruding therefrom, a plurality of perforation-producing punches or spikes 418. As depicted in FIG. 4, the punches 418 are positioned on the edge of the roller 416 in a manner to produce the desired perforation pattern (in the depicted embodiment, in a sinusoidal or wave-like pattern corresponding to the pattern depicted in FIGS. 3A and 3B). The paper 412 is thus continuously perforated along its edge as it is conveyed toward a downstream position 422 and, eventually, dispensed to the user. In order to provide the proper rate of rotation 424 of the roller 416 as the paper is moved 426, the rate of rotation 424 of the roller 416 can be controlled and coordinated with the rate of paper movement 426 by a gear train, one or more motor controllers or other coordinator 228 in a manner that will be well known to those of skill in the art after understanding the present disclosure.

The roller 416 can also be freewheeling, with rotation being driven by the paper movement. Although the perforation is described as occurring upon exit of the paper from the printer, the perforating wheel could also be positioned to provide perforation to the paper as it enters the printer or at other locations that will be apparent to those of skill in the art upon understanding the present disclosure.

Figure 5:
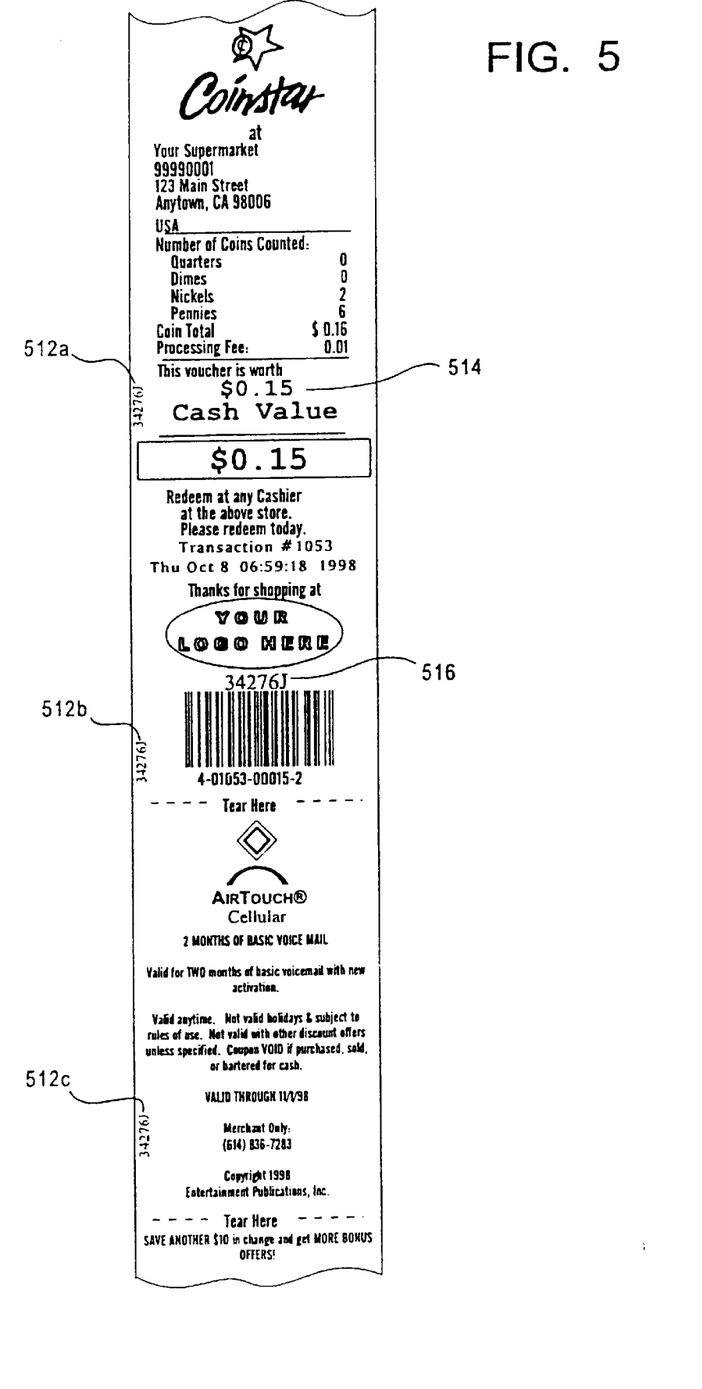
FIG. 5 is a front view of a voucher according to one embodiment of the present invention.

In one embodiment, some or all of a unit of the paper supply 226 (such as each roll of thermal paper) is associated with one or more serial numbers or other identifying numbers. In the embodiment of FIG. 5, the paper is preprinted, along the edge of the front surface, with such serial number or serial numbers. In the depicted embodiment, a single serial number associated with a roll of thermal paper and this number is printed at spaced intervals in a vertical fashion near an edge of the voucher, preferably within less than ¼ inch of the edge (similar to the manner described above in connection with the back surface edge printing 316 depicted in connection with FIG. 3B). In order to provide for ease of verifying the validity of the serial number, by the voucher redeemer, the serial number (or serial numbers) associated with the paper supply is also printed by the coin discriminator printer 18, e.g., substantially at the time the voucher value 514 is printed. In one embodiment, when service personnel load a roll of paper into the paper supply unit 226, such personnel also enter the serial number associated with the roll into the computer 46, e.g., using an I-O device such as a keyboard, touch screen, or similar device 232. In this way, the computer 46 has the information needed to control the printer 18 so as to print an identifier number 516 on the face of the voucher which will match the preprinted serial numbers 512 on the paper stock to permit the grocery store clerk or other redeemer to easily visually verify a match between the preprinted serial number 512 and the discriminator-printed serial number 516.

Although FIG. 5 depicts an embodiment in which a single serial number is associated with a unit of paper stock and is identically printed at intervals 512a, 512b, 512c, it is also possible to provide for identifying numbers which are preprinted on the paper stock, but which change along the length of a voucher or from one voucher to the next, such as incrementing by one or by some other number, or so as to change in some other manner (e.g., which is likely to be substantially unpredictable by a would-be counterfeiter). In this embodiment, it will be necessary for the computer 46 to be able to calculate or detect which preprinted serial number will be positioned near the area where the discriminator-printed number 516 will be printed so that the computer 46 can control the printer 18 to print a number 516 which will match the closest (or next preceding or succeeding) preprinted serial number 512b. For example, the printer 18 may be configured to inform the computer 46 of the number of inches of thermal paper that has been thus-far dispensed from the roll. If it is known how the preprinted numbers 512 change along the length of the roll (such as incrementing by one for every inch of thermal paper dispensed) the computer 46 will have sufficient information to calculate, in a manner which will be well known to those of skill in the art after understanding the present disclosure, what number to print, using the printer 18, so as to match the closest or next succeeding or preceding preprinted number.

Figure 6:
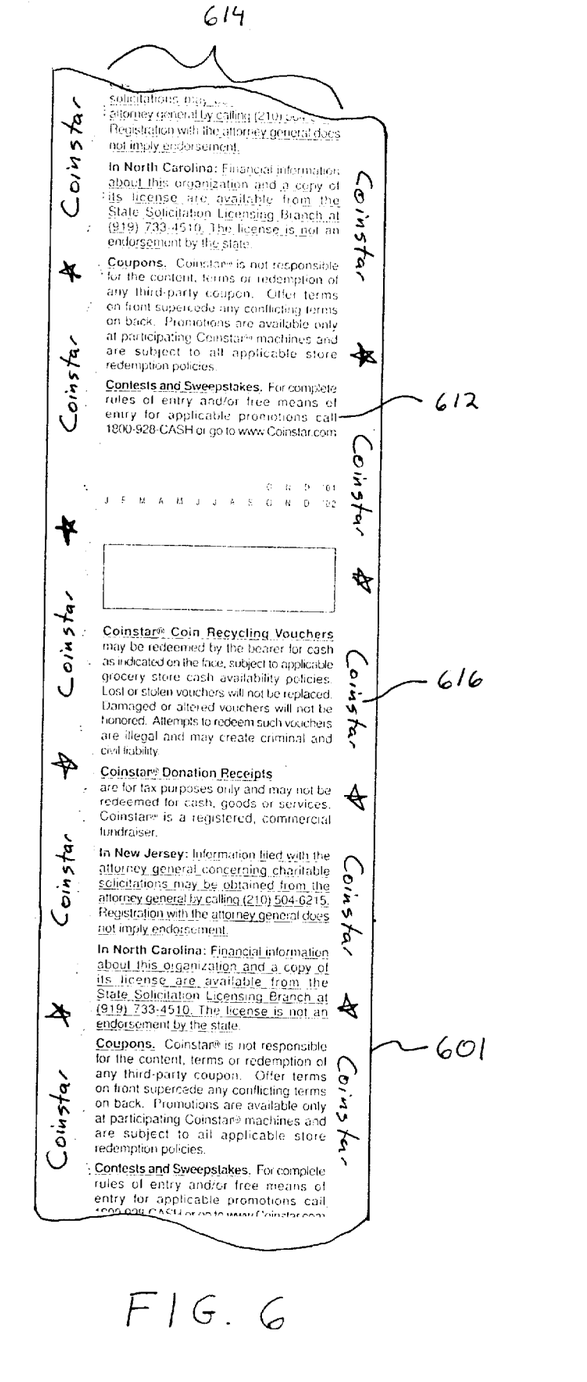
FIG. 6 is a view of a back surface of a voucher according to one embodiment of the present invention.

FIG. 6 depicts features of a voucher useful for avoiding, preventing and/or detecting unauthorized duplication or counterfeiting of vouchers in accordance with one embodiment of the invention. In the depicted embodiment, a substrate 201, such as a rear surface of a voucher, contains indicia, such as printing 616, that responds to changes in temperature. The printing 616 includes thermally responsive ink that becomes invisible when heated to or beyond an activation temperature. As used herein, the activation temperature is the lowest temperature at which the ink responds to heat. In one aspect of this embodiment, the printing 616 is vermillion, thermo-chromic ink with an activation temperature of approximately 85 degrees Fahrenheit. In other embodiments, other colors and types of thermally responsive indicia can be used. In another embodiment, the thermally responsive ink could be substantially invisible at room temperature and become visible when heated to or beyond an activation temperature. Furthermore, those of ordinary skill in the relevant art will appreciate that indicia with different activation temperatures can also be used in accordance with the disclosure.

One advantage of using thermally responsive indicia that has an activation temperature higher than typical room temperature and cooler than typical body surface temperature is that the indicia is thermally responsive to human touch. Accordingly, a person can breathe or touch the indicia for a few seconds and the indicia will respond, such as by becoming temporarily invisible.

In addition to using the thermally responsive printing 616, other thermally responsive indicia can be used on different areas of the voucher. For example, in the depicted embodiment the rear surface of the voucher includes printing 612 generally in the central region 614 that is oriented at an angle of approximately 90 degrees relative to the printing 616. Either some or all of the printing 612 can include thermally responsive indicia, such as thermally responsive ink. In addition, in other embodiments, a front surface of the voucher can also include thermally responsive indicia.

In another embodiment, thermally responsive ink can be placed on top of or proximate to other indicia, to camouflage the other indicia on the voucher. For example, in one embodiment black thermally responsive ink can be placed over text on a voucher. The black thermally responsive ink can be placed so that it renders the text unrecognizable to a viewer, such as a substantially solid block of black thermally responsive ink over the text. In this embodiment, when the thermally responsive ink is heated to the activation temperature, the thermally responsive ink disappears and the text becomes discernable to the viewer.

Thermally responsive indicia can be printed on a variety of substrates to provide voucher embodiments consistent with this disclosure. In one embodiment, for example, the thermally responsive ink is printed on 20–22 pound base paper with a brightness of 88.5% (minimum) and a thermal color of black trace. In other embodiments, other types of paper, including thermal paper, can be used.

In another embodiment, the substrate could change color in response to a change in temperature. For example, the substrate could be dark or opaque initially, and then change to white or a lighter color when heat is applied. A voucher incorporating this feature could include a thermally responsive substrate portion that is initially dark and located adjacent to other dark indicia to make the other dark indicia indiscernible. When heat is applied, the thermally responsive substrate portion changes to a lighter color, enabling the dark indicia to become discernable against the lighter background provided by the thermally responsive substrate. In an alternate embodiment, the thermally responsive substrate could be light-colored initially, and then change to a darker color when heat is applied. A voucher incorporating this feature could include a thermally responsive substrate portion that is initially light but configured to form the outline of indicia when heat is applied and it turns darker. When heat is applied to this voucher in the vicinity of the substrate, the thermally responsive substrate changes to a darker color, enabling the indicia to become discernable against the darker background provided by the thermally responsive substrate.

In the embodiment depicted in FIG. 6, the thermal indicia provides one of several means to authenticate the voucher. To authenticate the voucher, an individual, such as a cashier in a store, breathes on or touches the thermally responsive printing 616 for approximately 2–10 seconds. If the printing substantially disappears, the printing 616 on the voucher is authenticated. The individual can then proceed to authenticate the other anticounterfeiting features (discussed above) on the voucher.

In light of the above description, a number of advantages of the present invention can be seen. The present invention provides devices and procedures which facilitate reducing, eliminating, deterring and/or detecting attempts at unauthorized duplication and/or counterfeiting of vouchers. The present invention provides counterfeiting detection features which can be relatively readily implemented such as requiring little or no hardware and/or software modification, and, in some embodiments, requiring only the use of paper or paper stock having one or more of the features as described herein, and, in this manner, at least some features of the present invention can be retrofit, i.e., implemented readily in existing coin discriminators. The present invention provides at least some anti-counterfeiting or counterfeit detection features which use only, or primarily, visual inspection of the voucher and thus at least some features can be implemented without the need for modifying or adding hardware. At least some anti-counterfeiting or counterfeiting detection features can be performed relatively rapidly, such as verifying the correct color of various printing or indicia, correct positioning or registration, correct patterning or configuration of perforations and the like), preferably without requiring the redeemer to flip or rotate the voucher or otherwise manipulate the voucher, or enter data or otherwise handle the voucher (other than, e.g., to hold it up to ordinary light) such that at least some anti-counterfeiting or counterfeit detection features of the present invention can be implemented without substantial delay at a checkout lane. In some embodiments, certain features of the invention are not readily apparent upon visual inspection of a valid voucher and thus would-be counterfeiters may find it difficult to reproduce such features. For example, in one embodiment, at least some indicia are provided which fluoresce or have other visible characteristics only when exposed to ultraviolet or other special light. According to one embodiment, at least some indicia are provided which are substantially invisible until rubbed or scraped with a coin or similar object. Preferably in some embodiments the voucher is provided with features which are not readily reproduced or counterfeited without using devices or procedures which are typically not available to the general public. For example, perforations which are patterned in a curved, preferably tightly radiused pattern which preferably provides a periodic, smooth and/or repeating pattern and preferably is made using relatively small perforations are typically difficult to provide without special, not-readily-available, equipment.

A number of variations and modifications of the invention can also be used. It is possible to use some features of the invention without using others. For example, it is possible to use non-photocopying inks without using micro perforations, or it is possible to use front/back registered marks without using close-to-the-edge printing. Although the present invention has been described in connection with avoiding, preventing or detecting unauthorized duplication or counterfeiting of a coin-discriminator voucher, the present invention can also be used in connection with avoiding unauthorized duplication or counterfeiting of other items such as coupons, checks, tickets (such as airline, subway or other transportation tickets, game, performance, concert or other event tickets, and the like) negotiable instruments and the like. Although some features of the invention have been described as capable of implementation using a computer, it is possible to use other devices in place of a computer such as one or more application specific integrated circuits (ASIC's) hardwired Indoor discrete circuitry, and the like. Although embodiments relating to paper stock serial numbers were described as involving manual entry of serial numbers into the computer, it is also possible to provide for serial number entry by partially or fully automatic scanning or detection, such as using bar code scanners, magnetic ink detectors and the like. Although it is believed many other coin discriminators may involve the use of thermal printers, the present invention can be used in connection with many types of printers including laser printers, inkjet printers, dot matrix printers, line (impact) printers and the like. Although front/back surface registration of a pair of logos and a box was depicted, many shapes or symbols can be used for verifying registration. Although embodiments have been described which involve pre-printing or pre-providing certain items, it is also possible to use one or more printers housed in the coin discriminator device to print anti-counterfeiting items, such as printing in a fashion and/or with an ink which produces an altered appearance in a photocopy made therefrom.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A method for providing a voucher in a coin discriminator having a discriminator printer, with the voucher configured to assist in distinguishing unauthorized duplicate or counterfeit vouchers, the method comprising:

using the discriminator printer to print, on a substrate, at least a first indicia containing an indication of a value of the voucher;

providing a plurality of perforations in the substrate to define a first curved pattern of perforations; and providing the substrate with a thermally responsive second indicia.

2. The method of claim 1 wherein providing the substrate with a thermally responsive second indicia includes providing the substrate with thermo-chromic ink.

3. The method of claim 1 wherein providing the substrate with a thermally responsive second indicia includes providing the substrate with a thermally responsive second indicia that has an activation temperature of at least 75 degrees Fahrenheit.

4. The method of claim 1 further comprising:

receiving a plurality of coins in the coin discriminator; and counting the coins to obtain the value thereof.

5. The method of claim 1 wherein providing the substrate includes providing thermal paper.

6. The method of claim 1 further comprising placing a third indicia on the substrate, the third indicia being at least partially obscured by the thermally responsive second indicia.

7. The method of claim 1 wherein using the discriminator printer to print includes printing the first indicia at an angle of approximately 90 degrees relative to the thermally responsive second indicia.

8. A method in a coin-counting machine for providing a voucher configured to assist in distinguishing unauthorized duplicate or counterfeit vouchers, the method comprising:

providing a substrate with a thermally responsive first indicia; and printing on the substrate at the coin-counting machine at least a second indicia, the second indicia containing at least an indication of a value of the voucher.

9. The method of claim 8 wherein providing a substrate with a thermally responsive first indicia includes providing a substrate with thermo-chromic ink.

10. The method of claim 8 wherein providing a substrate with a thermally responsive first indicia includes providing a substrate with a thermally responsive indicia that has an activation temperature of at least 75 degrees Fahrenheit.

11. The method of claim 8 further comprising:

receiving a plurality of coins in the coin-counting machine;

counting the received coins to obtain a total value; and printing on the substrate the value of the voucher relating to the total value.

12. The method of claim 8 wherein providing a substrate includes providing thermal paper.

13. The method of claim 8 further comprising placing a third indicia on the substrate, the third indicia being at least partially obscured by the thermally responsive first indicia.

14. The method of claim 8 wherein printing on the substrate at least a second indicia includes printing the second indicia at an angle of between 70 and 110 degrees relative to the first indicia.

15. The method of claim 14 wherein printing the second indicia at an angle includes printing the second indicia at an angle of approximately 90 degrees.

16. The method of claim 8 wherein providing a substrate with a thermally responsive first indicia includes providing a substrate with a thermally responsive first indicia having a responsiveness of 2–10 seconds.

17. An apparatus for use in counting coins, comprising:

a coin discriminator usable to provide a total value related to a plurality of randomly received coins;

a printer operatively connected to the coin discriminator; and a substrate having a first indicia and being configured to receive a second indicia, the second indicia being printed by the printer and indicating a value related to the total value, at least one of the first or second indicia being thermally responsive.

18. The apparatus of claim 17 wherein the thermally responsive indicia includes thermo-chromic ink.

19. The apparatus of claim 17 wherein the thermally responsive indicia and has an activation temperature of at least 75 degrees Fahrenheit.

20. The apparatus of claim 17 further comprising a third indicia on the substrate, the third indicia being at least partially obscured by the thermally responsive indicia.

21. The apparatus of claim 17 further comprising a substantially non-visible mark on the substrate, wherein rubbing adjacent to the mark with an object renders the mark visible.

22. An apparatus for use in counting coins, comprising:

a coin discriminator usable to provide a total value related to a plurality of randomly received coins;

a printer operatively connected to the coin discriminator; and a substrate configured to receive thermally responsive indicia, the thermally responsive indicia being printed by the printer on the substrate.

23. The apparatus of claim 22 wherein the thermally responsive indicia includes thermo-chromic ink.

24. The apparatus of claim 22 wherein the thermally responsive indicia and has an activation temperature of at least 75 degrees Fahrenheit.

25. The apparatus of claim 22 wherein the thermally responsive indicia is a first indicia and wherein the substrate further includes a second indicia, the second indicia being at least partially obscured by the thermally responsive indicia.

26. The apparatus of claim 22 further comprising a substantially non-visible mark on the substrate, wherein rubbing adjacent to the mark with an object renders the mark visible.

27. An apparatus for use in counting coins, comprising:

a coin discriminator usable to provide a total value related to a plurality of randomly received coins;

a printer operatively connected to the coin discriminator; and a substrate having thermally responsive indicia, the substrate configured to be dispensed from the apparatus in response to a user input.

28. The apparatus of claim 27 wherein the thermally responsive indicia includes thermo-chromic ink.

29. The apparatus of claim 27 wherein the thermally responsive indicia is a first indicia, and wherein the substrate is configured to receive a second indicia, the second indicia being printed on the substrate by the printer, the second indicia including a value related to the total value.

* * * * *

UNITED STATES PATENT AND TRADEMARK OFFICE
CERTIFICATE OF CORRECTION

PATENT NO. : 6,644,696 B2
APPLICATION NO. : 10/039181
DATED : November 11, 2003
INVENTOR(S) : David J. Brown et al.

It is certified that error appears in the above-identified patent and that said Letters Patent is hereby corrected as shown below:

Cover page, paragraph (63), second line, after "1999", delete ", which is a continuation-in-part of application No. 07/940,931, filed on Sep. 4, 1992";

Column 1, line 12, "Mar. 8, 1998" should be --Mar. 9, 1998--;

Column 1, line 24, "Method," should be --Method,"--.

Signed and Sealed this

Twelfth Day of February, 2008

JON W. DUDAS
*Director of the United States Patent and Trademark Office*